United States Patent [19]

Moriwaki et al.

[11] Patent Number: 5,080,945
[45] Date of Patent: Jan. 14, 1992

[54] LARGE-CAPACITY-MEMORY DISK

[75] Inventors: Takeshi Moriwaki, Sakai; Shinji Tokuhara, Kobe, both of Japan

[73] Assignee: Daicel Chemical Industries, Ltd., Sakai, Japan

[21] Appl. No.: 657,890

[22] Filed: Feb. 19, 1991

Related U.S. Application Data

[63] Continuation of Ser. No. 517,507, Apr. 27, 1990, abandoned, which is a continuation of Ser. No. 913,043, Sep. 29, 1986, abandoned, which is a continuation of Ser. No. 722,744, Apr. 12, 1985, abandoned, which is a continuation of Ser. No. 454,515, Dec. 30, 1982, abandoned.

[51] Int. Cl.$^5$ .................................................. B32B 3/00
[52] U.S. Cl. ......................................... 428/64; 428/65; 428/913; 430/945; 346/135.1; 346/137; 360/135; 369/275.1; 369/283; 369/286
[58] Field of Search ............... 430/321, 536, 537, 945; 346/135.1, 137; 360/135; 369/275.1, 275.5, 283, 286; 428/64, 65, 913

[56] References Cited

U.S. PATENT DOCUMENTS 2,321,759  6/1943  Macht et al. ............................ 260/84
4,918,683  4/1990  Kodera et al. ......................... 369/275

FOREIGN PATENT DOCUMENTS 33446  2/1982  Japan .
57-123208  7/1982  Japan .
57-138601  8/1982  Japan .

*Primary Examiner*—Charles L. Bowers, Jr.
*Assistant Examiner*—Janis L. Dote
*Attorney, Agent, or Firm*—Flynn, Thiel, Boutell & Tanis

[57] ABSTRACT

In a large capacity memory disk of the type in which data are read out by an optical system, the invention provides a large capacity memory disk characterized in that a methyl methacrylate copolymer consisting of 99 to 20 percent by weight methyl methacrylate and 1 to 80 percent by weight of a monomer copolymerizable with methyl methacrylate is used as the disk substrate.

5 Claims, No Drawings

LARGE-CAPACITY-MEMORY DISK

This application is a continuation of U.S. Ser. No. 07/517,507, filed Apr. 27, 1990, now abandoned, which is a continuation of Ser. No. 06/913,043, filed Sept. 29, 1986, now abandoned, which is a continuation of Ser. No. 06/722,744, filed Apr. 12, 1985, now abandoned, which is a continuation of Ser. No. 06/454,515, filed Dec. 30, 1982, now abandoned.

This invention relates to an optical, large-capacity memory disk, hereinafter called a "disk", which term shall include a disk for only play-back use, such as a video disk and a digital audio disk, a disk for DRAW (direct read after writing), and a magneto-optical disk for reversible use.

More particularly, the present invention relates to a video disk whose substrate can be produced by the injection molding of a specific class of synthetic resin materials.

As is well known, the signal recorded on such a disk can be detected by a laser beam. The disk for only play-back use is a disk on which video signals and/or sound signals have been recorded in the form of small depressions, called pits. The pits conventionally have a width of about 0.4–0.6 $\mu$m and a depth of about 0.1 $\mu$m. The lengths of the pits and the spacing between adjacent pits are variable because these features are established by the signal that is recorded on the disk. The pits are arranged in a spiral track starting at an inside diameter and moving to an outside diameter of the disk. The average track pitch is about 1.6 $\mu$m. The disk is comprised of a base layer of transparent synthetic resin having the pits formed therein, a thin highly reflective metal layer applied on top of the base layer and a protective synthetic resin applied on top of the metal reflective layer. The disks conventionally have diameters from 20 cm to 35 cm. It is conventional to laminate two of such disk halves together to form a disk, having a total thickness of about 2.5 mm.

As is well known, a disk of the kind described above is a disk-like recording medium on which video signals and/or audio signals are recorded in the form of data pits. To read the recorded signal from the disk, an optical system comprising a laser beam is used. The disk for DRAW has, on a substrate, a metal layer which can be perforated or changed in color by the absorption of laser irradiation for recording customers' private information. The magneto-optical disk for reversible use has, on a substrate, a magnetic layer with a perpendicular easy axis of magnetization whereby writing and erasure of data can be made by inverting the magnetization direction. It is conventional that the recorded data on these disks are read by means of an optical technique of laser.

To produce this type of disk, several methods of molding a synthetic resin material are conventionally used to form the transparent substrate. These methods can be further classified into (1) a method, which is called the 2P process, in which a liquid of photopolymerizable resin is filled up between a stamper and the transparent substrate, which is cured by the irradiation of ultraviolet light to replicate the pattern of the stamper on the substrate, and (2) a method in which the data pits to be recorded are made on a synthetic resin sheet by compression molding by use of a tool called a stamper, which is a mirror image of the master disk, whereby to replicate on the synthetic resin sheet the pits on the master disk that define the recorded signal, and (2) a method in which the stamper is incorporated as one surface of an injection mold for forming a synthetic resin disk and a synthetic resin disk is formed by injection molding using that mold. Of the two methods, the latter injection molding method provides the advantages that the number of production steps is reduced, the heat energy necessary for the production can be saved and hence, the production cost becomes lower.

However, when producing a disk by the injection molding method, there are still problems yet to be solved. In particular, because the disk is a round sheet having a diameter of 300 mm and a thickness of about 1.2 mm, the synthetic resin material used to produce such a molded disk must have an extremely high fluidity. First, the material itself must have excellent fluidity when it is molten. In other words, it must be able to flow a long distance, that is, have a large fluidization length through the mold cavity at a particular injection pressure and injection speed employed at the injection molding. Secondary, the material must have the ability of replicating a large number of pits, or grooves, or a combination of these to the synthetic resin disk. Furthermore, the material itself must have a high light transmittance (preferably at least 88%) to read the information by a laser beam which passes through the plastic disk. However, no plastic material having such excellent properties has been known to date.

SUMMARY OF THE INVENTION

The inventors have carried out intensive experiment in search of a synthetic resin material that can satisfy the requirements described above, especially one that can replicate the pattern of pits and/or grooves to the molded disk. The inventors have discovered that a methyl methacrylate copolymer containing, in addition to methyl methacrylate monomer units, at least 1 percent by weight of units of a comonomer component, is far superior to poly(methylmethacrylate) (homo)-polymer in the properties described above. The present invention has been completed on the basis of this discovery.

DESCRIPTION OF THE PREFERRED EMBODIMENT

In a large capacity memory disk of the type in which data pits are made on one surface of a disk and are read by an optical system, the present invention provides a large capacity memory disk which is characterized in that a methyl methacrylate copolymer consisting of 99 to 20 percent by weight methyl methacrylate and 1 to 80 percent by weight of a vinyl monomer which is copolymerizable with methyl methacrylate, is used as the disk substrate or base layer.

The vinyl monomers that can be copolymerized with methyl methacrylate and can be used in the present invention are aromatic vinyl monomers, such as styrene, α-methylstyrene, m-methylstyrene, p-methylstyrene, o-chlorostyrene, m-chlorostyrene, p-chlorostyrene, 2,5-dichlorostyrene, m-bromostyrene and p-bromostyrene; unsaturated nitrile monomers, such as acrylonitrile and methacrylonitrile; alkyl methacrylates, such as ethyl methacrylate, propyl methacrylate, butyl methacrylate, stearyl methacrylate and octyl methacrylate; and alkyl acrylates, such as methyl acrylate, ethyl acrylate, propyl acrylate, butyl acrylate, octyl acrylate and stearyl acrylate. These vinyl comonomers can be used either alone or in the form of a mixture of two or more of them. Among them, styrene, methyl acrylate, ethyl acrylate and ethyl methacrylate are preferable.

As mentioned above, it is critical, according to the invention, that the copolymer consists of 99 to 20 weight percent of methyl methacrylate and 1 to 80 weight percent of another comonomer. It is preferable that the copolymer consists of 97 to 20 weight percent of methyl methacrylate and 3 to 80 weight percent of said another comonomer. It is also preferable that the copolymer consists of 99 to 60 weight percent of methyl methacrylate and 1 to 40 weight percent of said another comonomer. When the comonomer is a vinyl monomer other than styrene, the amount thereof is preferred to be from 3 to 40 weight percent. When the comonomer is styrene or the like, the amount thereof is preferred to be 1 to 80 weight percent. It is most preferable to use a copolymer consisting of methyl methacrylate monomer units and styrene monomer units in which the weight ratio of methyl methacrylate/styrene is from 90/10 to 80/20.

It is practical that the copolymer employed in the invention has a number average molecular weight of from 10,000 to 500,000, preferably from 20,000 to 250,000 and a weight-average molecular weight of from 20,000 to 2,000,000, preferably from 30,000 to 500,000, and has a melt flow rate of 20 g of per 10 mins. or less, preferably from 18 g/10 min. to 1 g/10 min. for methyl methacrylate/styrene copolymers, when measured in accordance with ASTM D 1238, condition I (230° C., 3.8 kg).

Although the mechanism of why and how the methyl methacrylate copolymers, such as a methyl methacrylate/styrene copolymer, provide a good replication of pits is not fully understood, the mechanism is assumed to be as follows. That is, molten resin injected from the nozzle of the injection molding machine into the mold cavity does not form the fine pits sequentially from the gate end to eventually form the molded article, but rather, it is first filled into the mold cavity in one stroke, and then is made into contact with the stamper by applying the injection pressure for a predetermined period of time, and then is solidified. From this viewpoint, it can be assumed that if a particular amount of a monomer copolymerizable with methyl methacrylate, such as styrene, is copolymerized with the latter, the fluidity of the molten synthetic resin becomes higher under a high shear stress, resulting to cause the molten resin material to be injected at one time into the cavity of the mold while said synthetic resin is kept at a high temperature, followed by the application of the predetermined injection pressure for a given period of time. Consequently, the molten polymer easily flows into close contact with the surface of the mold, resulting to replicate the fine pattern of the stamper on the disk.

The below-mentioned test data show that the methyl methacrylate copolymer exhibits increased fluidity under high shear stress, in comparison with a methyl methacrylate homopolymer. A homopolymer of methyl methacrylate having a melt flow rate of 30 g/10 mins. in accordance with ASTM D 1238, condition I, and a copolymer of 80 weight percent of methyl methacrylate and 20 weight percent of styrene having a melt flow rate of 10 g/10 mins. in accordance with ASTM D 1238, condition I, were measured with regard to their melt flow property in accordance with Japanese Industrial Standard K7210. In the measurement, the tested sample was melted at 230° C. in a heated cylinder having a cross-sectional area of 1 cm$^2$ and the pressure was applied so as to be extruded through a nozzle of 1 mm diameter and 10 mm length. The shear rate and the melt viscosity of the tested samples were determined based on the pressure and the amount of flow. The results indicates that the copolymer has a lower melt viscosity than the homopolymer as the shear rate becomes higher. Since it is customary to carry out injection molding at a shear rate of $10^4$ to $10^5$ sec.$^{-1}$, the copolymer exhibits decreased melt viscosity, in other words, an increased fluidity, compared to the homopolymer.

The disk of the present invention is suitable for use in a optical system using a laser beam. The optical, large capacity memory disk includes a pre-recorded disk such as a video disk and digital audio disk, and an optical disk for DRAW. The prerecorded disk for only playback use is prepared by injection molding a base layer using a stamper, which is a mirror image of the master having all data pits thereon, and then coating a reflective layer on the side of the pits in the base layer so that reading may be achieved by means of monochromatic laser beam. The optical, DRAW disk, is manufactured by injection molding using a stamper on which grooves are pregrooved in the concentric or spiral form and further pits are made for address and error correction code, and then a layer is applied thereon which may be perforated or changed in color by use of monochromatic laser beam, so that customers' private information may be written thereon and reading of that information can be made. Furthermore, a reversible magneto-optical disk can be used as the optical, large capacity memory disk. The magneto-optical disk is prepared from using the same type of disk substrate as that of the DRAW disk and applying thereto a magnetic film with uniaxial magnetic anisotropy perpendicular to the substrate whereby the heat and the magnetic field of monochromatic laser beam can reverse the magnetization direction for the purpose of writing additional information and/or erasure of previously recorded information, and reading can be performed using the magneto-optical Kerr effect, which may be described as the rotation of the direction of polaraization of linearly polarized light.

When practicing the present invention, an anti-static treatment can be applied to the surface of the disk.

The followings are examples of the present invention.

EXAMPLE 1

A copolymer of methyl methacrylate/styrene in a weight ratio of 60/40, having a weight average molecular weight of 130,000 and a number average molecular weight of 35,000, was injection molded using a molding machine in which a stamper was fitted as one surface of the mold. Aluminum was vacuum deposited onto the signal surface of the molded disk. When the resulting disk was played back to obtain a picture by the Philips display system (VLP), the read out picture was virtually free of jitter and signal drop-outs.

EXAMPLE 2

The same procedure as described in Example 1 was conducted, except that a copolymer of 85 weight percent of methyl methacrylate and 15 weight percent of styrene, having a weight-average molecular weight of 117,000 and a number-average molecular weight of 65,000, was employed. Good results were obtained in the same way as described in Example 1.

EXAMPLE 3

The same procedure as described in Example 1 was conducted, except that a copolymer of 95 weight percent of methyl methacrylate and 5 weight percent of methyl acrylate having a weight-average molecular weight of 124,000, a number-average molecular weight of 65,000, and a melt flow rate of 2 g/10 mins. was employed. Good results were obtained in the same way as described in Example 1.

EXAMPLE 4

A copolymer of 90 weight percent of methyl methacrylate and 10 weight percent of ethyl acrylate, having a weight-average molecular weight of 91,000, a number-average molecular weight of 52,000 and a melt flow rate of 4 g/10 mins. was injection molded to obtain a disk using a grooved stamper. The grooves were sufficiently transferred to the molded article. Then, a disk was obtained by sputtering a magnetic film of cobalt and gadolinium onto the molded article. Data recorded on the disk could be read out with very little noise.

The embodiments of the invention in which an exclusive property or privilege is claimed are defined as follows:

1. In a high-density-data-recording disk comprising a transparent synthetic resin substrate made by injection molding and having means on one surface thereof for providing recorded data which can be read by a pickup, the improvement which comprises: said substrate consists of a copolymer consisting essentially of 99 to 60 percent by weight of methyl methacrylate monomer units and 1 to 40 percent by weight of a styrene-containing comonomer, said copolymer having a number average molecular weight of from 10,000 to 500,000, a weight average molecular weight of from 20,000 to 2,000,000, and a melt flow rate of 20 g or less per 10 minutes.

2. A high-density-data-recording disk as claimed in claim 1, in which said copolymer consists essentially of not more than 97 weight percent of methyl methacrylate monomer units and at least 3 weight percent of units of said comonomer.

3. A high-density-data-recording disk as claimed in claim 1, in which said styrene-containing comonomer is selected from the group consisting of styrene, α-methylstyrene, m-methylstyrene, p-methylstyrene, o-chlorostyrene, p-chlorostyrene, 2,5-dichlorostyrene, m-bromostyrene and p-bromostyrene.

4. A high-density-data-recording disk as claimed in claim 1, in which the weight ratio of methyl methacrylate/styrene-containing comonomer is from 90/10 to 80/20.

5. In a high-density-data-recording disk, the improvement comprising said disk being manufactured by forming a copolymer of methyl methacrylate/styrene; injection-molding said copolymer in a molding machine having a stamper provided as a surface of the mold to form a molded disk; and vacuum depositing aluminum on a surface of the molded disk to form said high-density-data-recording disk, said copolymer having a weight ratio of methyl methacrylate/styrene of 60/40, a weight average molecular of 130,000 and a number average molecular weight of 35,000.

* * * * *